United States Patent [19]

Ahlm et al.

[11] Patent Number: 5,729,695

[45] Date of Patent: Mar. 17, 1998

[54] METHOD AND DEVICE FOR ACKNOWLEDGEMENT OF TRANSMITTED INFORMATION

[75] Inventors: Roger Ahlm, Motala; Ola Odmark, Upsala, both of Sweden

[73] Assignee: Pricer Inc., Norwalk, Conn.

[21] Appl. No.: 432,187

[22] PCT Filed: Nov. 8, 1993

[86] PCT No.: PCT/SE93/00935

§ 371 Date: Nov. 17, 1995

§ 102(e) Date: Nov. 17, 1995

[87] PCT Pub. No.: WO94/11832

PCT Pub. Date: May 26, 1994

[30] Foreign Application Priority Data

Nov. 9, 1992 [SE] Sweden ................. 92-03339

[51] Int. Cl.⁶ .................................. G06F 153/00
[52] U.S. Cl. ............. 395/220; 364/478.12; 455/11.1; 340/825.37; 340/825.69
[58] Field of Search ............. 395/216, 220–222; 455/54.1, 54.2, 57.1, 56.1, 33.2–33.4, 11.1, 15, 16; 379/59, 60; 340/827, 826, 825.01, 825.34, 825.37, 829.39, 825.53, 825.54, 825.69; 359/143, 172, 176; 370/243, 293; 364/478.12–478.17, 479.01

[56] References Cited

U.S. PATENT DOCUMENTS

| | | | |
|---|---|---|---|
| 4,821,291 | 4/1989 | Stevens et al. | 340/825.35 |
| 4,879,756 | 11/1989 | Stevens et al. | 455/39 |
| 4,888,709 | 12/1989 | Revesz et al. | 340/825.07 |
| 5,198,644 | 3/1993 | Pfeiffer et al. | 235/383 |
| 5,202,781 | 4/1993 | Heck | 359/152 |
| 5,379,229 | 1/1995 | Parsons et al. | 364/478.03 |
| 5,412,654 | 5/1995 | Perkins | 370/94.1 |
| 5,530,909 | 6/1996 | Simmon et al. | 455/11.1 |
| 5,563,728 | 10/1996 | Allen | 359/172 |

FOREIGN PATENT DOCUMENTS

| | | |
|---|---|---|
| 0443447 | 8/1991 | European Pat. Off. . |
| 441477 | 10/1907 | Sweden . |
| WO91 07028 | 5/1991 | WIPO . |
| WO92 16901 | 10/1992 | WIPO ............. G06F 15/21 |

Primary Examiner—Gail O. Hayes
Assistant Examiner—Frantzy Poinvil
Attorney, Agent, or Firm—Young & Thompson

[57] ABSTRACT

The present invention provides a method and a device for increasing the coverage in a shop data system for each individual information module (B1–B10), which has a low output power for its message acknowledgement at the reception of information, ensuring that a signal of acknowledgement indicating reception of information reaches a system computer. An information device, for instance a shelf-edge module (B5), which has received a correctly decoded information intended for this particular module, emits a signal of acknowledgement, which then is repeated by said other modules (B1–B4, B6–B10), which also have decoded said message finding that it was not intended for them. These modules (B1–B4, B6–B10) switch to a repeater mode so that said signal of acknowledgement emitted by said addressed module (B5), will be repeated by each such other module in said repeater mode, which perceives said signal of acknowledgement, said signal of acknowledgement propagating back to said transmitting unit (TX) during a period of time between transmitted messages. Herethrough, it is only required, that each information module has a coverage for its signal of acknowledgement such that this signal reaches at least one other additional information module.

19 Claims, 4 Drawing Sheets

METHOD AND DEVICE FOR ACKNOWLEDGEMENT OF TRANSMITTED INFORMATION

TECHNICAL FIELD

The present invention relates to a method and a device for acknowledgement of transmitted price information in connection with electronic information modules for price marking, and particularly to a method and a device executing an acknowledgement of information transmitted to an information module, when an information module of the kind possesses a limited coverage for its signal of acknowledgement due to a limited supply of power.

PRIOR ART

Today, systems, in which the price indicating items of information are stored in a central system computer, are introduced in greater department stores, which computer, in turn, provides the cash-point locations with price indicating items of information related to various articles. The cashier normally reads, usually by means of an optical reading device, a unique bar code, the so called EAN code, which is present on each article. Through this code the cash register thereby obtains the current price information of the article in question from the central system computer.

Further a shelf-edge marking is applied at the location of each article, which marking states the name of the article and normally also a cost-per-unit price, e.g. the price per kilogram. Earlier, each article was usually provided also with a sticker stating the price and possibly a temporary discount price. In order to reduce the cost of such a price marking, effort is made, particularly in larger department stores, to leave out the individual price marking of each article, in which case the price marking is achieved only by means of shelf-edge marking at the storing place of each type of article.

A further step in cost optimization includes electronic shelf-edge markings, which are controlled from the central system computer, thereby stating the price stored in the central system computer of the article in question. Through this, it will be ensured that the items of information of the price marking will correspond to the price charged to the customer at the cash-point, which obtains the price indicating items of information, just like the shelf-edge marking, from the central system computer. A type of such an electronic label system/signing system has been disclosed, e.g. in the Swedish patent SE 441 447 granted to S. Olsson and R. Ahlm in 1986 and assigned to the signer of the present application.

A problem in connection with a system comprising such electronic devices of presentation, or "displays", when the communication to these devices is carried out in a wireless manner, e.g. through transmission by means of light, is to efficiently receive an acknowledgement confirming that the shelf-edge unit in question has received the transmitted information correctly. Firstly, such a price-marking unit may be blocked by a separate object preventing the information from reaching the unit in question, and, secondly, with a limited supply of power, its problematic to obtain a sufficient coverage for its means of response for enabling the transmission of an unambiguous reply implying that information transmitted to the particular unit has been received correctly.

Common to such systems is that the transmission of information should be achieved wireless in order to obtain a flexible price-marking system. Thereby, the most applicable method of transmission is by means of light, suitably within the range of non-visible light, e.g. as IR light as used in prior art for various remote control devices to control electronic or electrical apparatuses, such as TV-sets etc.

Such a system is disclosed, e.g. in the European patent document EP-A2-0 443 447. Here, a bi-directional system is disclosed, which optically signals back to the transmitting device directly or by reflection and scattering or by deflection. In the disclosed system, the electronic label/shelf-edge module will consist of a relatively complicated unit, since the acknowledgement system requires additional complex electronics, while the system will require a considerable control power, fundamentally necessitating each unit to be provided with a battery, which, thereby, will have to be exchanged regularly. This means considerable expenses for a larger shop data system possibly comprising 10 000 labels/information modules.

Another document WO 91/07028 discloses a system for transmitting data between a number of participating units in a local communications network. The system utilizes at least two substations, which assist in transmitting binary data between the participant units in the network, transmitted data being pulse modulated and substations repeating each received partial pulse after a certain time delay. This system presents great limitations to the large number of participating units, which will be included in a shop data system having shelf-edge markings. In addition to the complexity of each substation, the system will require power levels for the responding units, which levels are higher than what is practically applicable in a flexible system for information devices in a shop.

DESCRIPTION OF THE INVENTION

According to the present invention, a method is provided to increase the coverage of each individual information device, e.g. a shelf-edge module, having a low output power for its message acknowledgement at the reception of information, ensuring that an acknowledgement stating that information has been received reaches the system computer.

According to the method of the present invention, an information device, which has received a correctly decoded information intended for that particular module, emits a signal of acknowledgement, whereas all other modules, which obtain the same information and thereby realize that the message is not intended for the module in question, switch to a repeater mode, whereby the signal of acknowledgement emitted by the addressed module will be repeated by each other such module, which has perceived the signal of acknowledgement, whereby the signal of acknowledgement thus will propagate back to the transmitting device.

According to a further aspect of the method of the present invention, the transmitting device will wait for a certain period of time following the transmission of a message addressed to a specific module, at the time of which, as soon as a signal of acknowledgement, which has propagated directly or has been repeated by one or more modules unaddressed by the message in question, during this waiting period reaches the transmitting device, it will thereby be ensured that the thus addressed module will have received its information correctly, which will then be noted in the system computer, and it will thereby be ensured, e.g., that an information module having price marking displays the same information as that, which the cash-point register will charge a customer for the article, the price of which has been given by means of the information module in question.

According to yet another aspect of the method of the present invention, it is only required that each information module has a coverage for its signal of acknowledgement, such that it will reach at least one additional information module, which thereby will forward the signal of acknowledgement.

Further according to the present invention, a subsystem will be provided as well as a signalling device intended to be comprised in each information device to execute the signalling according to the method, the signalling device comprising an electromagnetic or light emitting source having a low power consumption making it possible to continuously energize the information module by means of a solar cell.

DESCRIPTION OF FIGURES

The invention will now be described in the form of a preferred embodiment by means of the appended drawings, wherein.

AN ILLUSTRATIVE EMBODIMENT

Figure 1:
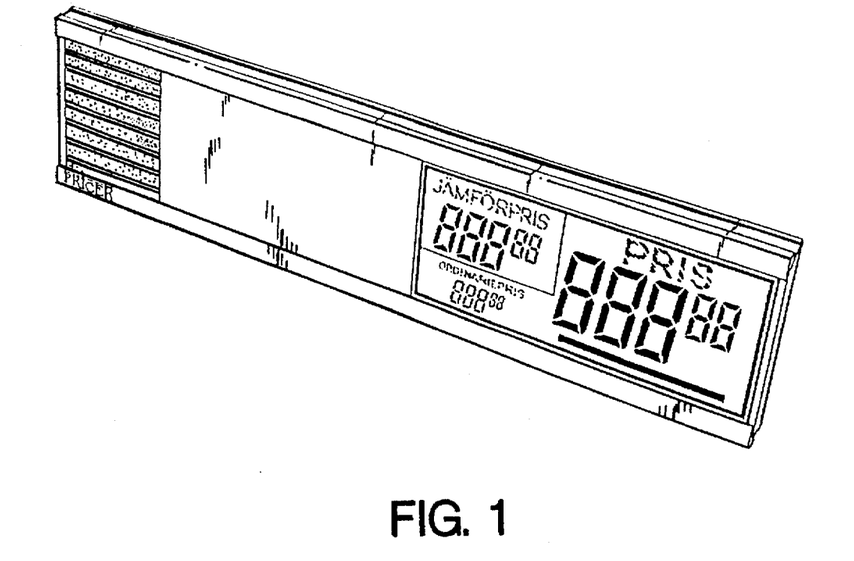
FIG. 1 illustrates an embodiment of an information module for which the present invention is intended to be applied.

FIG. 1 shows as an embodiment an electronic label/information module in the form a shelf-edge device for price-marking articles and products in a department store, which module is intended to be equipped with an acknowledgement device according to the method of the present invention. The information module of FIG. 1 has a field of representation to the right in the form of an LCD display for presentation of various numerical items of information such as price, cost-per-unit price, regular price etc. It may also be used, for instance for non-public purposes, to show other information stored. Leftmost on the module, essentially a solar cell is provided, which supplies the module with electric power by means of the lighting present in the shop. Between the LCD display and the solar cell, a field is provided for the introduction of a standardized paper label having additional information about the article in question.

Figure 2:
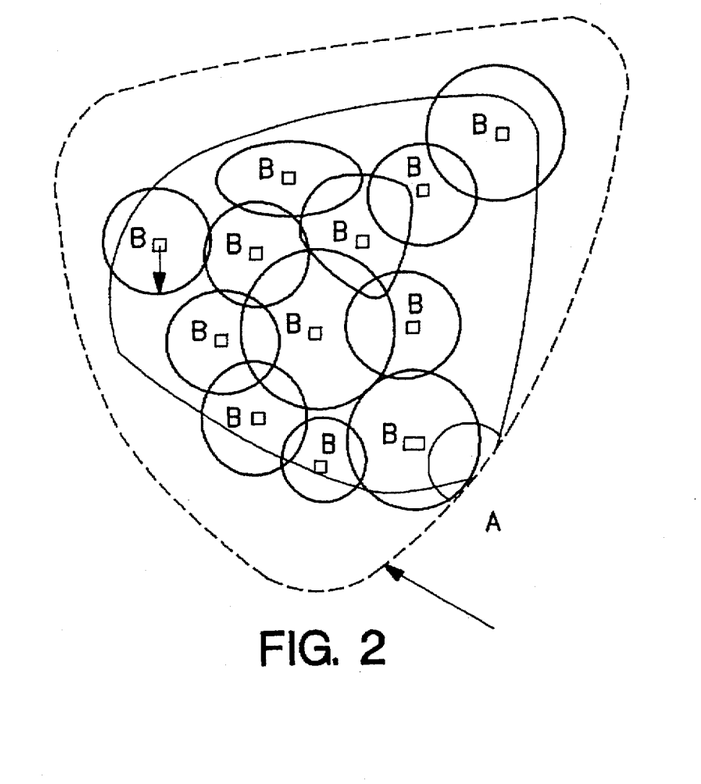
FIG. 2 illustrates an example of the way the total coverage is changed for the individual modules in the case where the coverage of at least one module includes the central receiver.

FIG. 2 shows a sketch of the way the method of acknowledgement fundamentally functions according to the present invention in an sketched example, in which only one of the information modules B has a coverage for its means of acknowledgement such that the signal of acknowledgement reaches the unit A transmitting information. No power limits exists for the transmitting unit A, which implies that the unit will have no problem in obtaining a coverage indicated by the shaded area, which covers all information modules, whereas the information modules B each have its own coverage marked by the circles, respectively. Further, each of the modules B has a unique address and may thus be addressed by A. In the case where a remote module B (marked by an arrow in FIG. 2) is addressed by the transmitting device A and this device acknowledges a correctly received message by transmitting a signal of acknowledgement, this signal of acknowledgement will not have a sufficient coverage due to power limitations as the module B will only be energized by a solar cell utilizing light existing in the premises. The addressed module B, which has been switched to a second mode of function upon the decoding of the data information received from A at the established correspondence of the ID or address, and which initiates a transmission of a pulse of acknowledgement intended for the unit A. In this case the addressed module B will thus, however, not be able to acknowledge its received message directly to A, since its coverage indicated by the circle line around B does not cover A. In FIG. 2, it is only the functional module B closest to A, which has an area of coverage which includes A.

According to the present invention, all other modules B, which have received the information transmitted by A and established that the address or ID did not correspond with their own addresses, are switched to a third mode of function. This mode has a function such that if the information module in this third mode perceives a signal of acknowledgement transmitted from another module, the logical circuitry of the module will initiate that a secondary signal of acknowledgement will be transmitted, upon which the module will switch back to its basic mode of function. Through this repeater mode by means of the other information modules, the module B of FIG. 2, in this case, the addressed one, will thereby obtain an actual secondary coverage indicated by the dash line, and the acknowledgement of the received message may thus reach the unit A, which sent the information.

Figure 3:
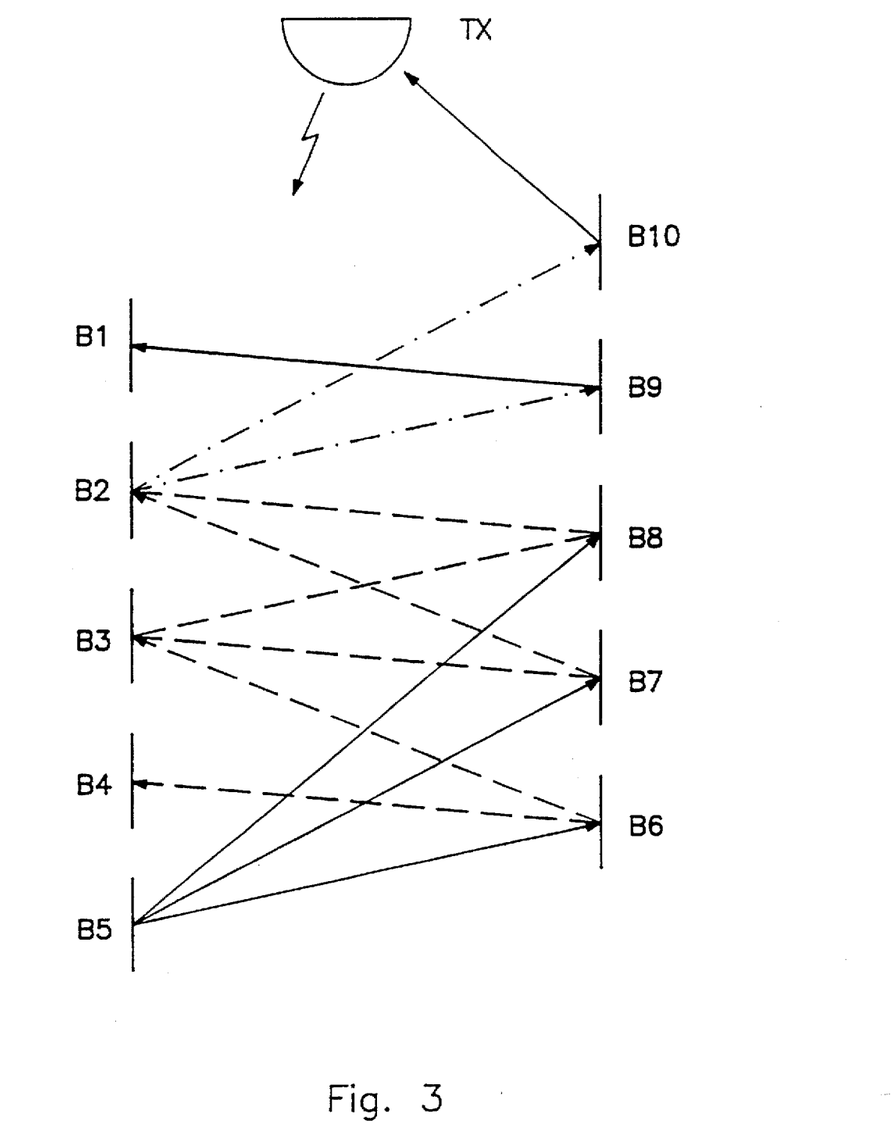
FIG. 3 illustrates in a simplified manner the principle of repetition of a signal of acknowledgement from an addressed module.

FIG. 3 shows in a more detailed manner what happens at an acknowledgement according to the present system. The transmitting unit requiring an acknowledgement of a transmitted message is designated with the reference letters TX, while the information modules present in the example are designated with references B1–B10, B5 being the addressed module. TX transmits a data package, which, in the preferred embodiment, consists of 216 bits, which are pulse-width modulated onto a IR light signal. This transmission takes place for period of time of the magnitude of 27 ms in the preferred embodiment, upon which TX is switched to a mode of reception for a period of time of 4 ms in the embodiment. In principle, the data package includes three main groups of information, one of which is an address or ID indication, another of which is a portion of data information including, for instance, price information etc., and a third of which is an error check code CRC by means of which the information modules will be able to determine whether the message has been correctly received and decoded. In the example of FIG. 3, the module B5 will establish that it constitutes itself the addressed module and will thereby switch to its second mode of function, while the other modules receiving the transmitted message correctly but finding themselves not addressed will switch to a third mode of function for period of time $T_r$.

After having been switched to the second mode of function, B5 will transmit a primary pulse of acknowledgement. In the preferred embodiment, this will be in the form of a single pulse having a length of the magnitude of 50 μs, but may in an additional embodiment comprise more Than one pulse. After this, B5 will return to its basic mode of function. This pulse of acknowledgement will not be perceived by TX but will be detected by B6, B7 and B8, which in this situation are set to the third mode of function, and they will therefore each initiate transmission of a secondary pulse of acknowledgement, upon which they will return to their basic mode of function. In the embodiment, the secondary signal of acknowledgement, just like the primary pulse of acknowledgement, consists of a single pulse, which in the preferred embodiment has a length of about 14 μs, but which in an additional embodiment, just like the primary pulse of acknowledgement, may be composed by a number of different pulses. These secondary pulses of acknowledgement will be perceived by B4, B3 and B2, B3 and B2 further, in fact, obtaining pulses from several repeating modules. B3 obtains a signal from B6, B7 and B8, whereas B2 obtains a signal, from B7 and B8. Let us further assume that B4 in this case did not perceive the message transmitted to B5 correctly and consequently did not switch to the third mode of function. Consequently, B4 will not repeat the secondary pulse of acknowledgement from B6 in this case. B5 will not react to a signal from B6, B7 and B8, since B5 is not in the third mode of function. B3 will send a secondary pulse of acknowledgement, which again will reach also B6, B7 and B8 but as they fundamentally will not be in the third mode of function, since they have already detected a pulse of acknowledgement, they will not react anymore. B2 will send a pulse of acknowledgement which thereby will reach B7, B8, B9, and B10. Neither are B7 and B8 in the third mode of function and will thus not react. B9 and B10 will however be initiated to transmit a secondary pulse of acknowledgement, the pulse from B10 reaching TX, at which TX will obtain acknowledgement implying that the addressed module B5 has received its information correctly. Also B1 will transmit a secondary pulse of acknowledgement but no further module will react, since the modules B2–B10 will have returned to their basic mode of function. B1 having transmitted its secondary pulse of acknowledgement, all modules will be in the basic mode of function and will themselves Be ready to receive new information from TX and to acknowledge or to relay a signal of acknowledgement. This whole process will take place within a period of time smaller than $T_r$, this thus being the condition under which the signal from B10 is to be perceived by TX as a signal of acknowledgement from B5.

Figure 4:
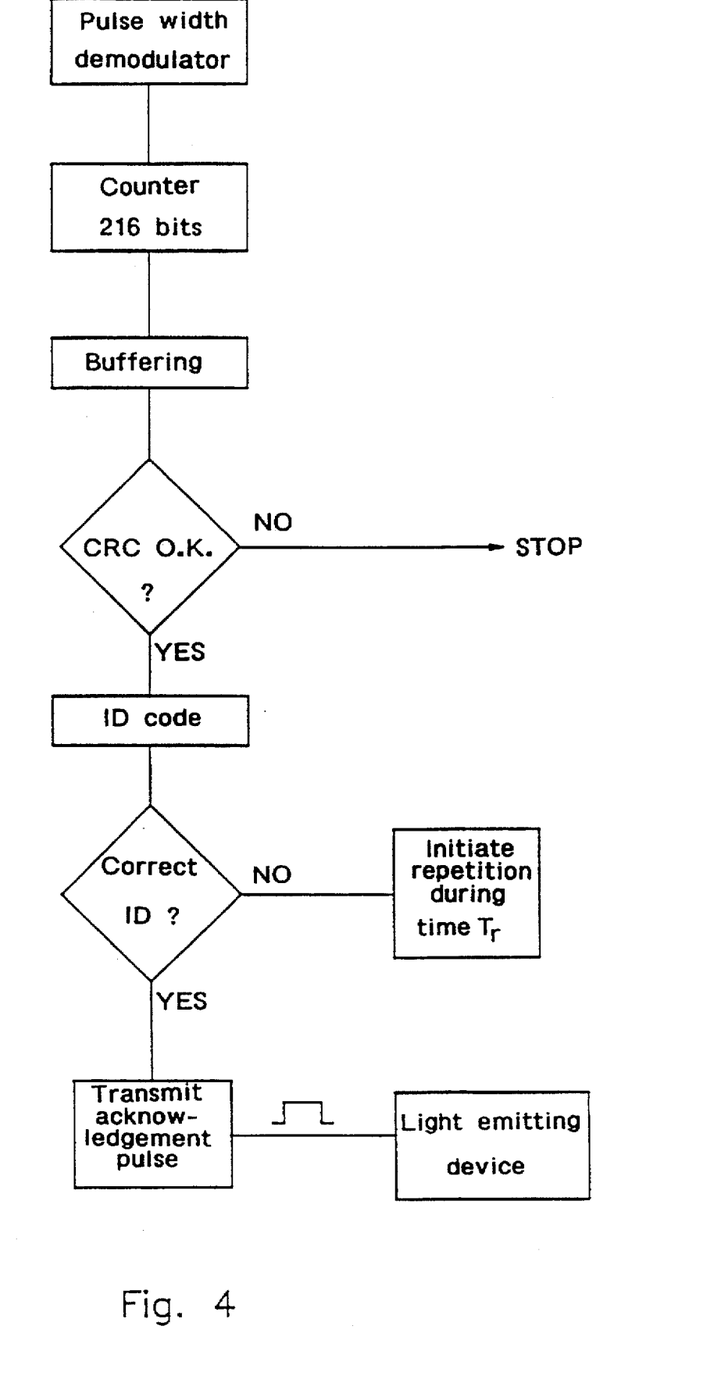
FIG. 4 illustrates a portion of the information module logic for acknowledgement of reception of an addressed message in the form of a simplified diagram.

FIG. 4 shows a fundamental logical diagram of the acknowledgement function according to the embodiment, when the information device is in the basic mode of function. The regular receiver device in the information module (not shown) receives signals transmitted by the central controlling transmitting device (TX in FIG. 3). These signals are pulse-width demodulated, a signal value of 1 e.g. corresponding to a pulse width of 30 μs and a signal value of 0 corresponding a pulse width of 8 μs. The number of bits are counted in a counter until, in this case, all 216 bits have been registered. The data bits are buffered in a conventional manner according to prior art, the CRC code being checked as to its indication of a correct reception of the entire data package. Should it have been received incorrectly, STOP will be obtained and the data processing and the module will wait in their basic mode of function for a new data transmission. Should the CRC check indicate that the entire message has been received correctly, the ID code will be extracted and it will be checked whether or not the ID code corresponds to the ID of the information module in question. Should the ID or address be the correct one, the logical circuitry will then initiate a 50 μs voltage pulse, which will be applied to a light emitting device, which will emit an IR light pulse equal to the length of the applied voltage pulse, upon which the information module will return to the basic mode of function, i.e. wait for a new transmission of data information. The data information received will thereby be displayed according to prior art on the display of presentation.

Figure 5:
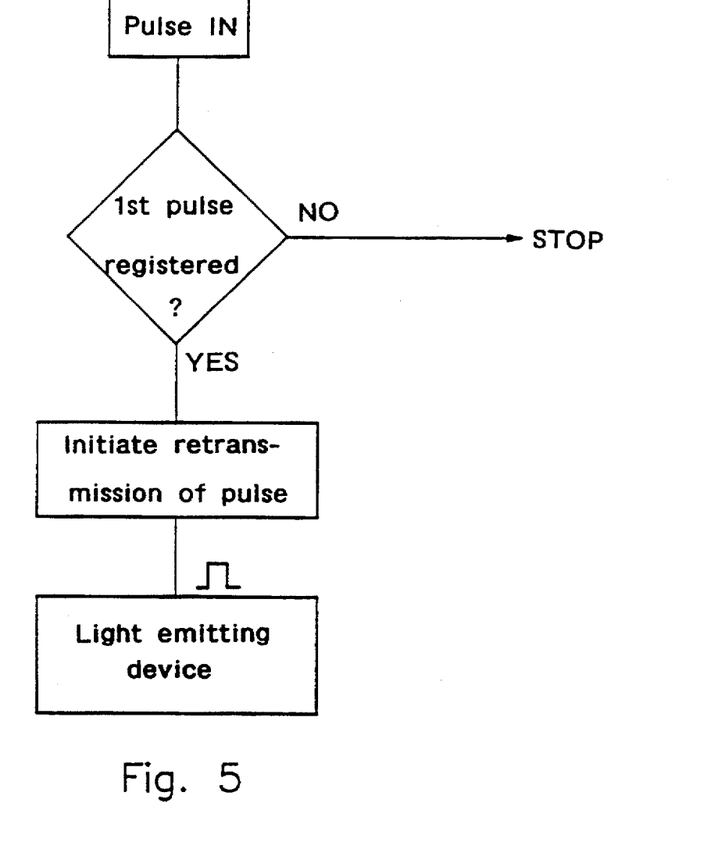
FIG. 5 illustrates a simplified logical diagram for the information module, when it is set to a repeater mode.

Should the ID or address not be the correct one, the logical circuitry will be set to a third mode, or a repeater mode. FIG. 5 shows in a simplified manner a logical diagram of the function, when the information module has been switched to the third mode of function. Should an adjacent module transmit a light pulse constituting a primary or a secondary signal of acknowledgement and should the receiving means of this module perceive this signal, a check will be made to investigate whether or not it is the first pulse after the setting of the third mode of function. Should it not be the first pulse, the logical circuitry will go to the STOP function, i.e. the module will switch back to the basic mode of function without taking any other action. Should the logical circuitry establish that this is the first signal of acknowledgement perceived, transmission of a secondary pulse of acknowledgement is initiated by applying in the embodiment a 14 μs voltage pulse to the light emitting device, which thereby will emit a light pulse corresponding thereto.

Should the information module within a period of time $T_r$ (FIG. 4) in the embodiment not have registered any primary or secondary light pulse constituting a signal of acknowledgement, the logical device of the information module will reset the module to its regular basic function, i.e. for receiving messages transmitted from the transmitting device TX. Thus, in the embodiment $T_r$<4 ms.

TX will thus transmit for a maximum of approximately 27 ms in the preferred embodiment, upon which it will wait for a signal of acknowledgement for the subsequent approximately 4 ms. Should a signal of acknowledgement be obtained within this period of time, the system computer monitoring the shop data system will thereby have obtained an indication implying that the information module in question has obtained the intended information. Should no acknowledgement be obtained, the system computer will know, guided by the address, exactly which information module and thus which article will not have received new information, and in this way it will be ensured that the items of information assigned by the system computer to the cash-points will correspond to, for instance, the price indicating items of information indicated by an information module. By conventionally interrogating the system computer, information will be obtained as to which modules do not respond to a repeated transmission at a certain time, and it will thus be easy to investigate whether, for instance, this information module has been, e.g., blocked or whether any other abnormal condition has occurred.

Figure 6:
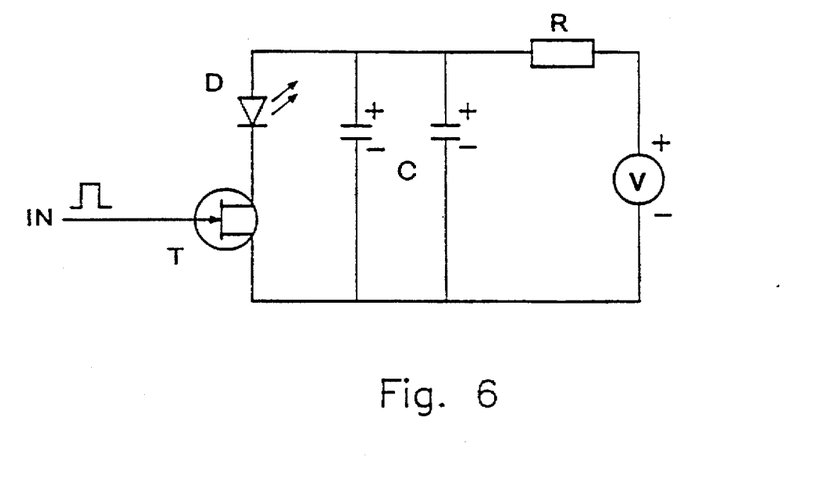
FIG. 6 illustrates as an embodiment a means of acknowledgement for transmitting or repeating a signal of acknowledgement.

FIG. 6. shows a preferred embodiment of the light emitting device comprising only a standard CMOS type field effect transistor T having a high input impedance on the gate electrode, an IR emitting light diode, a capacitor battery C and a resistor R. The capacitor C, which may be constituted by one or more capacitors depending on the insertion space in the information module, is charged from a solar cell through the resistor R, which has a high value of resistance to adapt the load on the solar cell. A voltage pulse from the logical circuitry is input to the gate of the transistor T at initiation of a primary or secondary signal of acknowledgement. During the period of time, under which the input voltage pulse is high, the line channel of the transistor will be completely opened, thus permitting current to flow through the diode D from the capacitor battery C. Since the pulse duration is short, 50 or 14 μs, the capacitor battery will not have time to discharge completely, while, further, the capacitor battery will continuously obtain a small charging power through the resistor R from the solar cell. Through the arrangement with the capacitor battery, a considerably greater power than normally provided by the solar cell may thus be momentarily extracted for a limited period of time, but the total energy integrated by the capacitor battery will be more than sufficient.

According to the present invention, the coverage of each individual information module only has to amount to 3–4 m, while a coverage many times greater than this value and more than enough to cover the distances, which may exist in shop premises, will be obtained through the method of repetition.

In the description, a preferred embodiment has been discussed. The electronic implementation of the logical functions discussed may be realized in various ways according to what is already well-known to a person skilled in the art and has thus been excluded from a detailed description. As to the circuitry, the method and device according to the present invention may in connection herewith be realized in a number of different electronic embodiments within the scope of the claims stated below.

We claim:

1. A method for acknowledgement of information transmitted by a transmitting device (A) in a shop data system to an electronic label/information module (B) for price marking, comprising a presentation display having price indicating items of information and relevant items of information relating to a certain article, said information module (B) preferably being operated by a solar cell, and said information module (B) further comprising electronics for interpretation and storage of data information transmitted from a system computer and for presentation of said data information on said display, said information module being arranged having an electronically defined unique address or an ID, characterized in that said information module (B1–B10) transmitting an electromagnetic signal of acknowledgement having a wavelength preferably corresponding to that of said transmitting device (A), that each thus addressed data information from said transmitting device (A, TX) is transmitted in the form of a data package comprising a predetermined number of data bits followed by a time slot for registration of said signal of acknowledgement, that a primary signal of acknowledgement transmitted by an addressed information module (B5) is repeated by other information modules (B1–B4, B6–B10), which are not addressed at that time, whereby a further propagation of said transmitted signal of acknowledgement is obtained, such that even if the coverage of said acknowledgement in the primarily addressed information module (B5), which transmitted said primary signal of acknowledgement, is not sufficient to reach a receiver device (A, TX) in a system, this receiver device is reached by said secondary signal of acknowledgement repeated by other information modules (B1–B4, B6–B10), whereby the acknowledgement signal by said addressed information module (B5) has correctly been received by said system computer.

2. The method according to claim 1, characterized in that said information module (B5), when a correctly received and decoded message addressed to said module is received, is switched from a basic mode of function to a second mode, in which second mode is initiated to transmit said primary signal of acknowledgement, and, subsequently to the transmission of said signal of acknowledgement, said information module (B5) is reset to said basic mode of function.

3. The method according to claim 2, characterized in that said information module (B1–B4, B6–B10), when a message is received, which is not addressed to said module but which is correctly received and decoded is temporarily switched to a third mode, in which third mode, at the detection of a primary signal of acknowledgement from another addressed module or at the detection of a repeated secondary signal of acknowledgement, in said information module (B1–B4, B6–B10) is then initiated to transmit said secondary signal of acknowledgement, and, following the transmission of said signal of acknowledgement, said information module is reset to said basic mode of function.

4. The method according to claim 3, characterized in that an information module (B1–B4, B6–B10) switched to said third mode through reception of a message, which is not addressed to said module but which is correctly received and decoded which module does not detect any primary or secondary signal of acknowledgement after a period of time ($T_r$) smaller than the period of time between two consecutive transmissions of data information from said transmitting device (A, TX) is reset to said basic mode of function for receiving and decoding of new data information transmitted by said system computer.

5. The method according to claim 4, characterized in that said primary signal of acknowledgement consists of at least one short electromagnetic pulse in order to keep the power consumption of said module at the lowest level possible.

6. The method according to claim 5, characterized in that said secondary signal of acknowledgement consists of at least one short electromagnetic pulse having a length preferably shorter than said primary signal of acknowledgement in order to keep said power consumption of said module at the lowest level possible.

7. The method according to claim 5, characterized in that said signal of acknowledgement consists of at least one light pulse in the IR range, which is created by a pulse of electric voltage, which is applied to a light emitting diode or LED in said module.

8. The method according to claim 6, characterized in that said signal of acknowledgement consists of at least one light pulse in the IR range, which is created by a pulse of electric voltage, which is applied to a light emitting diode or LED in said acknowledgement device.

9. A subsystem in a shop data system for acknowledgement of information transmitted by a device (A) in said shop data system to an electronic label/information module system for price marking, comprising a presentation display having price indicating items of information and relevant items of information relating to a certain article, said information module system preferably being operated by means of a solar cell, and said information module system (B) further comprising electronics for interpretation and storage of data information transmitted from a system computer and for presentation of said data information on said display, whereby each information module system is arranged having an electronically defined unique address or an ID, characterized in that said information module system is provided with a means of acknowledgement for transmission of an electromagnetic signal of acknowledgement having a wavelength preferably corresponding to the wavelength of said transmitting device (A) and comprising an electrically controllable switch in series with an element emitting electromagnetic energy, which element is supplied by a capacitor battery (C) obtaining electrical charge through a limiting resistor (R) from said solar cell, that said information module system further is provided with an additional logical circuitry, which controls said means of acknowledgement in response to messages received by said information module system.

10. The subsystem according to claim 9, characterized in that said means of acknowledgement and said additional logical circuitry generate at least one voltage pulse of a predetermined duration or a number of different predetermined durations when a signal of acknowledgement is to be transmitted, that said information module system, when a correctly received and decoded message addressed to said module is received, is switched from a basic mode of function to a second mode, in which second mode said additional logical circuitry initiates said means of acknowledgement to transmit a primary signal of acknowledgement, and, following the transmission of said signal of acknowledgement, said information module system is reset to said basic mode of function.

11. The subsystem according to claim 10, characterized in that said additional logical circuitry of said information module system, when a message is received, which is not addressed thereto but which is correctly received, temporarily switches said information module system to a third mode of function, in which third mode said information module system, following detection of said primary signal of acknowledgement from another addressed information module or detection of a secondary signal of acknowledgement, then initiates said means of acknowledgement in said information module system to transmit a secondary signal of acknowledgement, and, following the transmission of said signal of acknowledgement, said information module system is reset to said basic mode of function.

12. The subsystem according to claim 11, characterized in that said additional logical circuitry of said information module system, which has switched said information module system to said third mode at the reception of a message, which is not addressed thereto but which is correctly received and decoded and in connection therewith does not detect any primary or secondary signal of acknowledgement after a period of time $(T_r)$ smaller than the period of time between two consecutive transmissions of data information from said transmitting device (A) resets said information module system to said basic mode of function for receiving and decoding of new data information transmitted by said shop data system.

13. A device for acknowledgement of information transmitted by a transmitting device (A) in a shop data system to an electronic label/information module (B) for price marking, comprising a presentation display having price indicating items of information and relevant items of information relating to a certain article, said information module (B) preferably being operated by means of a solar cell, and said information module (B) further comprising electronics for interpretation and storage of the data information transmitted from a system computer and for presentation of said data information on said presentation display, said information module being arranged having an electronically defined unique address or an ID, characterized in that said information module (B) further is provided with a means of acknowledgement for transmission of an electromagnetic signal of acknowledgement having a wavelength preferably corresponding to the wavelength of said transmitting device (A) and comprising an electrically controllable switch in series with an element emitting electromagnetic energy, which element is supplied by a capacitor battery (C) obtaining electrical charge from said solar cell through said limiting resistor (R), that said information module (B) is provided with an additional logical circuitry, which controls said means of acknowledgement in response to messages received by said information module (B).

14. The device according to claim 13, characterized in that said electrically controllable switch preferably consists of a MOS transistor (T) connected in series with said element emitting electromagnetic energy, said MOS transistor (T) obtaining at its gate or gate electrode a voltage pulse from said additional logical circuitry in the electronics when a signal of acknowledgement is to be transmitted, that said additional logical circuitry of said information module (B), when a correctly received and decoded message addressed to said module is received, from a basic mode of function switches said information module to a second mode, in which second mode said additional logical circuitry initiates said means of acknowledgement to transmit a primary signal of acknowledgement, and, following the transmission of said signal of acknowledgement, said information module returns to said basic mode of function.

15. The device according to claim 14, characterized in that said additional logical circuitry of said information module (B), when a message is received, which is not addressed thereto but which is correctly received temporarily sets said information module (B) into a third mode of function, in which third mode, at the detection of a primary signal of acknowledgement from another addressed module or at the detection of a secondary signal of acknowledgement, said additional logical circuitry of said information module then initiates said means of acknowledgement in said information module (B) to transmit a secondary signal of acknowledgement, and, following the transmission of said signal of acknowledgement, resets said information module to said basic mode of function.

16. The device for acknowledgement of information according to claim 15, characterized in that said element in said means of acknowledgement, which element emits electromagnetic radiation is a light emitting diode or LED within the IR range, said diode being located so that its radiation is emitted within an angular area in front of the front side of said information module (B).

17. The device for acknowledgement of information according to claim 14, characterized in that said element in said means of acknowledgement, which element emits electromagnetic radiation is a light emitting diode or LED within the IR range, said diode being located so that its radiation is emitted within an angular area in front of the front side of said information module (B).

18. The device for acknowledgement of information according to claim 15, characterized in that said additional logical circuitry of said information module (B), which has set said information module (B)

in said third mode of function at the reception of a message, which is not addressed thereto but which is otherwise correctly received and at the time of which said information module does not detect any primary or secondary signal of acknowledgement after a period of time ($T_r$) smaller than the period of time between two consecutive transmissions of data information from said transmitting device (A), resets said information module to said basic mode of function for receiving and decoding of new data information transmitted by said system computer.

19. The device for acknowledgement of information according to claim 14, characterized in that said element in said means of acknowledgement, which element emits electromagnetic radiation is a light emitting diode or LED within the IR range, said diode being located so that its radiation is emitted within an angular area in front of the front side of said information module (B).

* * * * *